Oct. 13, 1953   B. M. GOLD   2,654,986
SPINNERFLEX MOWING MACHINE CUTTERHEAD
Filed July 5, 1951
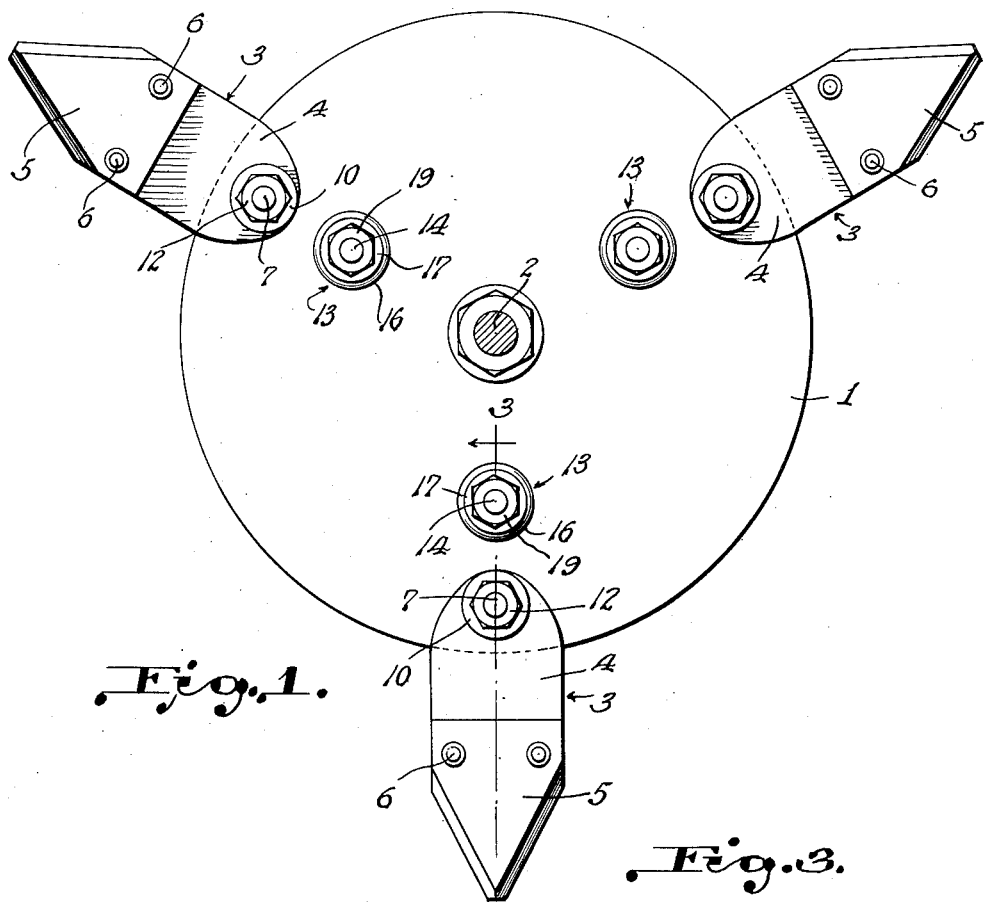
Fig. 1.
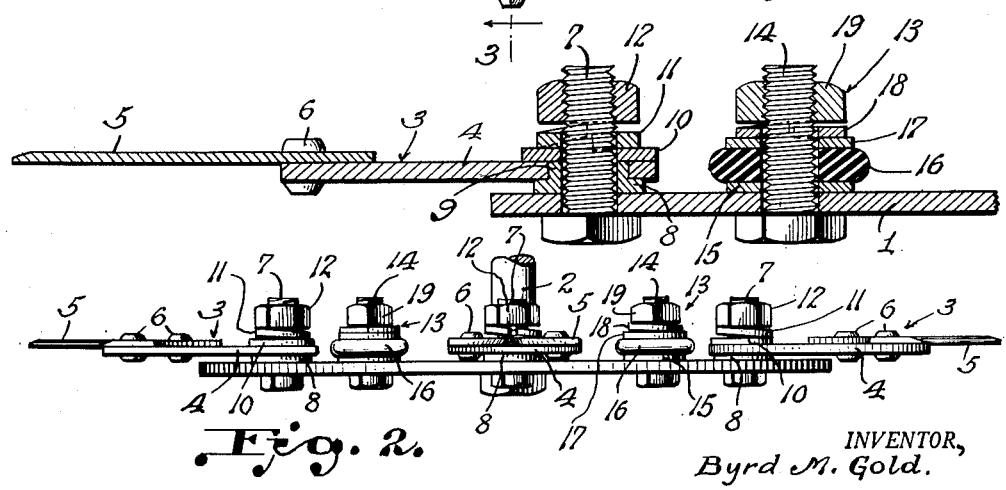
Fig. 3.
Fig. 2.
INVENTOR,
Byrd M. Gold.
BY
E. E. Vrooman & Co.,
ATTORNEYS.

Patented Oct. 13, 1953

2,654,986

UNITED STATES PATENT OFFICE 2,654,986

SPINNERFLEX MOWING MACHINE CUTTERHEAD

Byrd M. Gold, Tampa, Fla.

Application July 5, 1951, Serial No. 235,147

3 Claims. (Cl. 56—295)

This invention relates to a spinnerflex, mowing machine, rotary cutter-head.

An object of this invention is to provide a cutter-head with efficient means so that when the pivoted blade hits a solid obstruction it will rotate on the disc plate and strike a resilient bumper causing the blade to rebound into position where it is normally held by the centrifugal force of said rotating disc plate.

Other objects of this invention are that when the blade strikes a solid obstruction it will not break, but will give; when the blade strikes a solid obstruction it will not cause damage to the connecting rod, crank shaft, or keyway in the motor; the motor will not stop upon the blade striking a solid obstruction, nor will there be any danger to the operator of the mower, or to bystanders, by reason of a broken blade.

With the foregoing and other objects in view, this invention comprises certain novel constructions, combinations, and arrangements of parts as will be hereinafter fully described, illustrated in the accompanying drawings, and more particularly pointed out in the appended claims.

In the drawings:

Figure 1 is a top plan view of a rotary cutter-head constructed in accordance with this invention.

Figure 2 is a view in side or edge elevation.

Figure 3 is an enlarged sectional view taken on line 3—3, Figure 1, and looking in the direction of the arrows.

Referring to the drawings, in which the preferred embodiment of this invention is illustrated, 1 designates a disc plate which is usually secured to a drive shaft 2, which shaft is a part of a standard rotary lawnmower.

In the drawings there are preferably shown three pivoted blades 3. Each blade 3 comprises an inner section 4 and an outer section 5. These sections are fixedly secured together by preferably rivets 6. A bolt 7 is provided for each pivoted blade 3, the bolt extending through the disc plate 1, Fig. 3, and on this bolt is mounted an inner washer 8, which washer has an upstanding sleeve 9. The section 4 of the blade 3 fits on the washer 8 and around the sleeve 9. A second flat washer 10 rests on top of the sleeve 9 so that the blade 3 will revolve quite freely on the sleeve 9, and on top of this washer 10 is a split washer 11. On the bolt 7 is a lock nut 12 which is adapted to be screwed against the split washer 11 to securely fasten a pivoted blade upon the disc plate 1.

The bumper device 13 comprises a bolt 14 that extends through the disc plate 1. Mounted on bolt 14 is a flat washer 15 which bears against the plate 1. A rubber ring bumper 16 is mounted on the bolt 14 and is against the flat washer 15. A flat washer 17 is on the bolt against the top of the rubber ring bumper 16. A flat washer 18 is on the bolt against washer 17, this washer 18 being split. A lock nut 19 is on bolt 14 against the split washer 18. When the lock nut 19 is screwed tightly upon bolt 14 the elements mounted on said bolt will be securely fastened in place. It will be obvious upon referring to the drawings that three bumper devices are employed, close to the three pivoted blades.

When an obstruction is contacted by either of the blades, the blade will swing inwardly upon bolt 7, striking against the rubber washer 17 whereupon the blade will rebound to its outer position as shown in the drawings this action being materially assisted by the centrifugal force on the blades caused by the rapid rotation of the disc plate 7. In the beginning of this specification the objects stated cover fully the advantages of this device.

While I have illustrated a rubber ring bumper, any resilient ring or washer may be used, although the most efficient results are obtained from employing a washer-like bumper of rubber.

The structure of the washer 8 permits the pivoted blade 3 to be properly positioned for striking the rubber ring bumper 16 when the pivoted blade is forced inwardly by reason of striking a foreign object or obstruction. This operation I have found from practical experience with the device, performs in an efficient manner.

While I have described the preferred embodiment of the invention and illustrated the same in the accompanying drawings, certain minor changes or alterations may appear to one skilled in the art to which this invention relates during the extensive manufacture of the same, and I, therefore, reserve the right to make such changes or alterations as shall fairly fall within the scope of the appended claims.

What I claim is:

1. In a lawn mower having a rotating power shaft, a disc plate carried by the lower end of said shaft, a series of blade members spaced around the disc plate adjacent its periphery, each blade comprising an inner section having a semicircular end and an outer section including two converging sharpened edges, each of said members having one end of its inner sections freely pivoted on pivot means fixed on the disc plate, each blade member being movable between a position overlying the disc plate and a position projecting radially from the plate, each blade being of a length exceeding distance between the pivot point thereof and the center of the disc, and bumpers each fixed on the disc plate in the path of pivoting movement of a respective blade member, said bumpers being positioned between the center of the disc plate and the pivot means of the blades on radial lines leading from the center of the disc to the pivots of the blades, said pivot means each including a bolt extending through the disc, a washer on said bolt having an upwardly extending sleeve portion on which the blade member engages and means to hold said blade member on the sleeve.

2. In a lawn mower having a rotating power shaft, a disc plate carried by the lower end of said shaft, a series of blade members spaced around the disc plate adjacent its periphery, each blade comprising an inner section having a semicircular end and an outer section including two converging sharpened edges, each of said members having one end of its inner sections freely pivoted on pivot means fixed on the disc plate, each blade member being movable between a position overlying the disc plate and a position projecting radially from the plate, each blade being of a length exceeding distance between the pivot point thereof and the center of the disc, and bumpers each fixed on the disc plate in the path of pivoting movement of a respective blade member, said bumpers being positioned between the center of the disc plate and the pivot means of the blades on radial lines leading from the center of the disc to the pivots of the blades, each of said bumpers including a bolt extending upwardly through the disc, a washer on said bolt and resting on the disc, a rubber ring on the bolt and resting on the washer, and means holding the rubber washer in place and effecting compression thereof.

3. In a lawn mower having a rotating power shaft, a disc plate carried by the lower end of said shaft, a series of blade members spaced around the disc plate adjacent its periphery, each blade comprising an inner section having a semicircular end and an outer section including two converging sharpened edges, each of said members having one end of its inner sections freely pivoted on pivot means fixed on the disc plate, each blade member being movable between a position overlying the disc plate and a position projecting radially from the plate, each blade being of a length exceeding distance between the pivot point thereof and the center of the disc, and bumpers each fixed on the disc plate in the path of pivoting movement of a respective blade member, said bumpers being positioned between the center of the disc plate and the pivot means of the blades on radial lines leading from the center of the disc to the pivots of the blades, said pivot means each including a bolt extending through the disc, a washer on said bolt having an upwardly extending sleeve portion on which the blade member engages and means to hold said blade member on the sleeve, each of said bumpers including a bolt extending upwardly through the disc, a washer on said bolt and resting on the disc, a rubber ring on the bolt and resting on the washer, and means holding the rubber washer in place and effecting compression thereof.

BYRD M. GOLD.

References Cited in the file of this patent

UNITED STATES PATENTS

| Number | Name | Date |
|---|---|---|
| 1,868,918 | Schenk | July 26, 1932 |
| 2,281,639 | Swan | May 5, 1942 |
| 2,529,870 | Golasky | Nov. 14, 1950 |

FOREIGN PATENTS

| Number | Country | Date |
|---|---|---|
| 391,967 | Great Britain | May 11, 1933 |